(12) United States Patent
Mellet et al.

(10) Patent No.: US 8,556,766 B2
(45) Date of Patent: *Oct. 15, 2013

(54) MULTI-SPEED TRANSMISSION

(75) Inventors: Edward W. Mellet, Rochester Hills, MI (US); James M. Hart, Belleville, MI (US); Andrew W. Phillips, Rochester, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/308,156

(22) Filed: Nov. 30, 2011

(65) Prior Publication Data
US 2012/0214635 A1 Aug. 23, 2012

Related U.S. Application Data

(60) Provisional application No. 61/444,043, filed on Feb. 17, 2011.

(51) Int. Cl.
*F16H 3/62* (2006.01)
(52) U.S. Cl.
USPC .......................................... 475/276
(58) Field of Classification Search
None
See application file for complete search history.

(56) References Cited

U.S. PATENT DOCUMENTS

| | | | |
|---|---|---|---|
| 6,558,287 B2 | 5/2003 | Hayabuchi et al. | |
| 7,101,305 B2 | 9/2006 | Tabata et al. | |
| 7,163,484 B2 | 1/2007 | Klemen | |
| 7,722,496 B2 * | 5/2010 | Phillips et al. | 475/276 |
| 7,753,820 B2 * | 7/2010 | Phillips et al. | 475/276 |
| 7,887,453 B2 * | 2/2011 | Phillips et al. | 475/275 |
| 8,047,950 B2 * | 11/2011 | Wittkopp et al. | 475/276 |
| 2005/0090362 A1 | 4/2005 | Abe et al. | |
| 2006/0270513 A1 | 11/2006 | Klemen | |
| 2006/0270516 A1 | 11/2006 | Klemen | |
| 2012/0178582 A1 * | 7/2012 | Wittkopp et al. | 475/276 |
| 2012/0214636 A1 * | 8/2012 | Hart et al. | 475/276 |
| 2013/0029799 A1 * | 1/2013 | Park et al. | 475/276 |

* cited by examiner

*Primary Examiner* — Dirk Wright

(57) ABSTRACT

A transmission includes an input and output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least two to establish at least eight forward speed ratios and at least one reverse speed ratio between the input member and the output member.

32 Claims, 4 Drawing Sheets

| GEAR STATE | CLUTCHING ELEMENTS | | | | | |
|---|---|---|---|---|---|---|
| | 24 | 26 | 28 | 30 | 32 | 34 |
| REV | X | | | X | | |
| N | | | | O | | |
| 1ST | | | | X | | X |
| 2ND | | X | | | | X |
| 3RD | | | X | | | X |
| 4TH | X | | | | | X |
| 5TH | | | | | X | X |
| 6TH | X | | | | X | |
| 7TH | | | X | | X | |
| 8TH | | X | | | X | |

X = ON - ENGAGED CARRYING TORQUE
O = ON - ENGAGED NOT CARRYING TORQUE

MULTI-SPEED TRANSMISSION

CROSS-REFERENCE TO RELATED APPLICATIONS

This application claims the benefit of U.S. Provisional Application No. 61/444,043 filed on Feb. 17, 2011. The disclosure of the above application is incorporated herein by reference.

FIELD

The invention relates generally to a multiple speed transmission having a plurality of planetary gear sets and a plurality of torque transmitting mechanisms, and more particularly to a transmission having eight speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least two to establish at least eight forward speed ratios and at least one reverse speed ratio between the input member and the output member.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting the state of engagement of the various torque transmitting mechanisms in each of the available forward and reverse speeds or gear ratios of the transmissions illustrated in FIGS. 1-5.

DETAILED DESCRIPTION

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. A second component or element of a third planetary gear set is permanently coupled to a second component or element of a fourth planetary gear set. Finally, the second component or element of the second planetary gear set is permanently coupled to a third component or element of the third planetary gear set.

Figure 1:
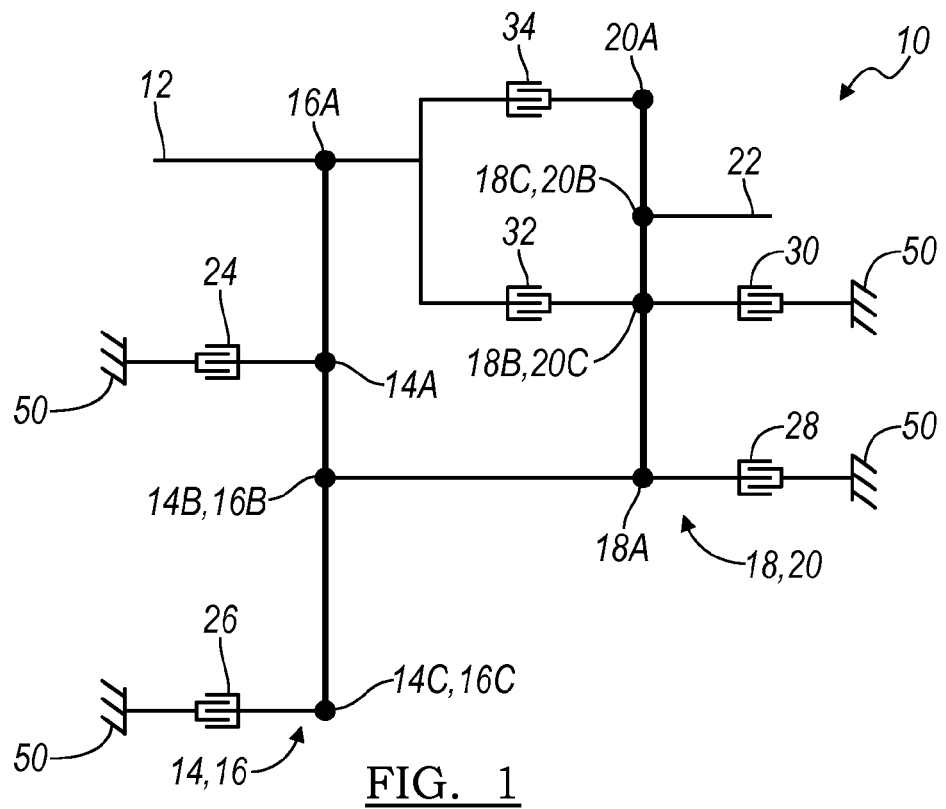
FIG. 1 is a lever diagram of an example of an eight speed transmission according to the present invention.

Referring now to FIG. 1, an example of an eight speed transmission 10 is illustrated in a lever diagram format in accordance with the present invention. A lever diagram is a schematic representation of the components of a mechanical device such as an automatic transmission. In a lever diagram, a single lever may represent a single planetary gear set having three basic mechanical components: a sun gear member, a ring gear member and a planet gear carrier member. However, a lever may also represent a pair of planetary gear sets wherein the three basic mechanical components of the planetary gear set or the shared mechanical components of the paired planetary gear sets are each represented by a node. In such cases, a single lever contains four nodes. Two of the nodes each represent either a mechanical component that is shared between the two planetary gear sets or a mechanical component of one of the paired gear sets that is interconnected to a mechanical component of the other of the paired gear sets. One of the nodes is the sun gear member, ring gear member or planet gear carrier member of one of the paired planetary gear sets. Finally, one of the nodes is the sun gear member, ring gear member or planet gear carrier member of the other of the paired planetary gear sets. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

With continuing reference to FIG. 1, transmission 10 includes an input shaft or member 12, a first planetary gear set pair 14/16 having four nodes: a first node 16A, a second node 14A, a third node 14B/16B and a fourth node 14C/16C, a second planetary gear set pair 18/20 having four nodes: a first node 20A, a second node 18C/20B, a third node 18B/20C, and a fourth node 18A and an output shaft or member 22.

In the example of the present invention shown in FIG. 1 the first node 16A of the first planetary gear set pair 14/16 is coupled to the input shaft or member 12. The third node 14B/16B of the first planetary gear set pair 14/16 is coupled to the fourth node 18A of the second planetary gear set pair 18/20. The second node 18C/20B of the second planetary gear set pair 18/20 is coupled to the output shaft or member 22.

The example of the transmission 10 of FIG. 1 includes a first brake 24 selectively connecting the second node 14A of the first planetary gear set pair 14/16 with a stationary member 50. A second brake 26 selectively connects the fourth node 14C/16C of the first planetary gear set pair 14/16 with the stationary member 50. A third brake 28 selectively connects the fourth node 18A of the second planetary gear set pair 18/20 with the stationary member 50. A fourth brake 30 selectively connects the third node 18B/20C of the second planetary gear set pair 18/20 with the stationary member 50. A first clutch 32 selectively connects the first node 16A of the first planetary gear set pair 14/16 with the third node 18B/20C of the second planetary gear set pair 18/20. A second clutch 34 selectively connects the first node 16A of the first planetary gear set pair 14/16 with the first node 20A of the second planetary gear set pair 18/20.

Figure 2:
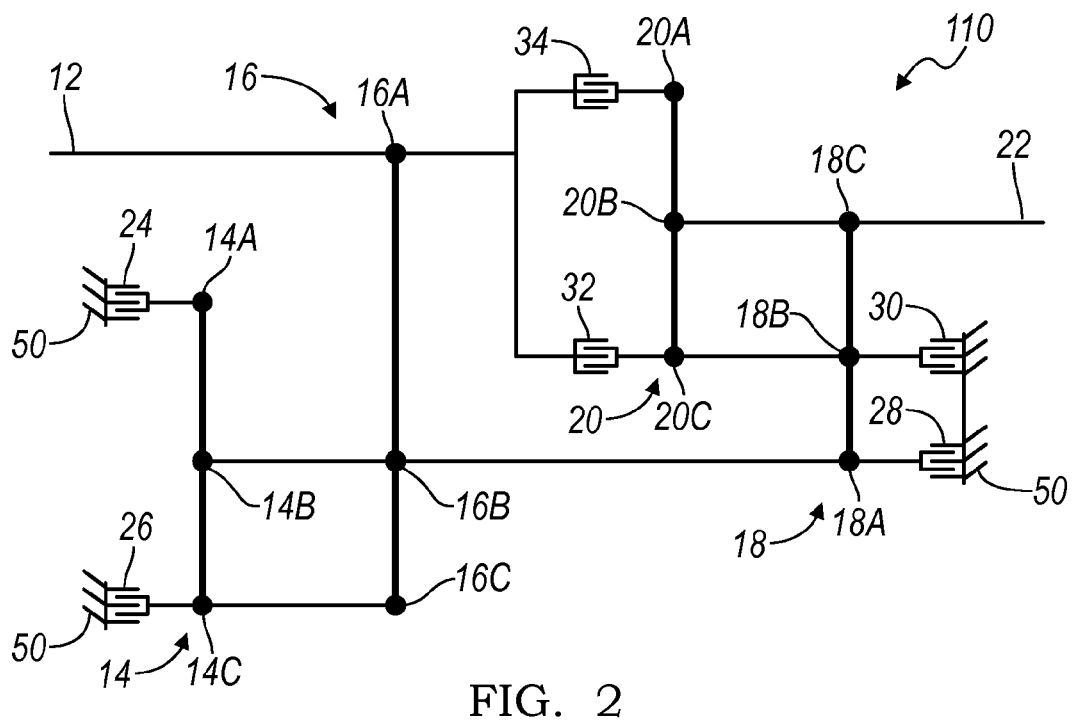
FIG. 2 is lever diagram of an example of an eight speed transmission according to the present invention.

Referring now to FIG. 2, an example of an eight speed transmission 110 is illustrated in a three node lever diagram format. In FIG. 2, the numbering from the lever diagram of FIG. 1 is carried over. The transmission 110 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input shaft or member 12 is coupled to the first node 16A of the second planetary gear set 16. The second node 14B of the first planetary gear set 14 is coupled to the second node 16B of the second planetary gear set 16. The third node 14C of the first planetary gear set 14 is coupled to the third node 16C of the second planetary gear set 16. The second node 16B of the second planetary gear set 16 is coupled to the first node 18A of the third planetary gear set 18. The second node 20B of the fourth planetary gear set 20 is coupled to the third node 18C of the third planetary gear set 18. The third node 20C of the fourth planetary gear set 20 is coupled to the second node 18B of the third planetary gear set 18. The output shaft or member 22 is coupled to the third node 18C of the third planetary gear set 18 and the second node 20B of the fourth planetary gear set 20.

A first brake 24 selectively connects the first node 14A of the first planetary gear set 4 with a stationary member 50. A second brake 26 selectively connects the third node 14C of the first planetary gear set 14 and the third node 16C of the second planetary gear set 16 with the stationary member 50. A third brake 28 selectively connects the second node 14B of the first planetary gear set 14, the second node 16B of the second planetary gear set 16 and the first node 18A of the third planetary gear set 18 with the stationary member 50. A fourth brake 30 selectively connects the third node 20C of the fourth planetary gear set 20 and the second node 18B of the third planetary gear set 18 with the stationary member 50. A first clutch 32 selectively connects the third node 20C of the fourth planetary gear set 20 and the second node 18B of the third planetary gear set 18 with the first node 16A of the second planetary gear set 16 and the input shaft or member 12. A second clutch 34 selectively connects the first node 20A of the fourth planetary gear set 20 with the first node 16A of the second planetary gear set 16 and the input shaft or member 12.

Figure 3:
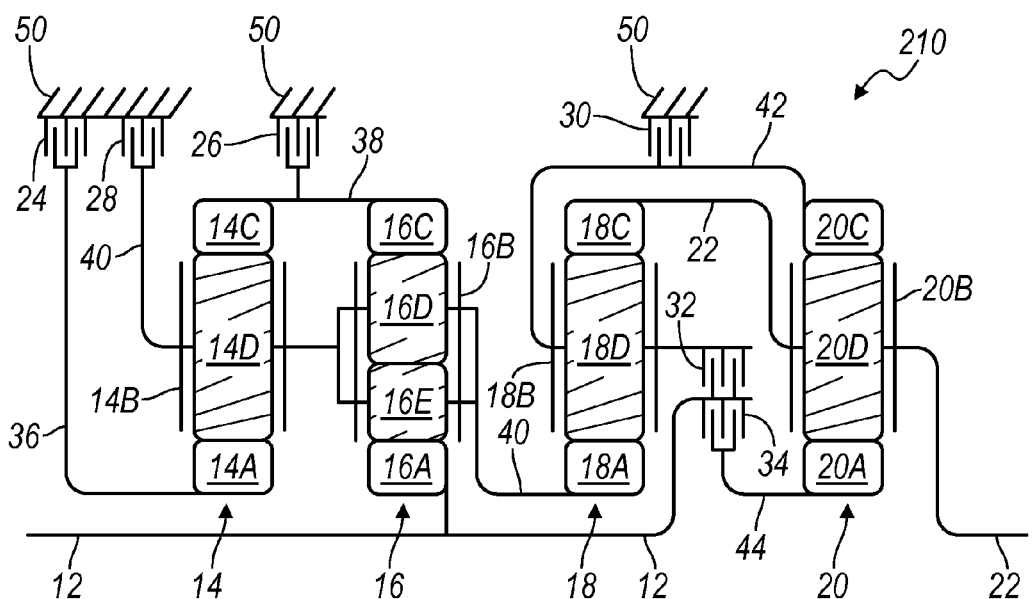
FIG. 3 is a diagrammatic view of an example of an eight speed transmission according to the present invention.

Referring now to FIG. 3, a stick diagram presents a schematic layout of the embodiment of the eight speed transmission 210 according to the present invention. In FIG. 3, the numbering from the lever diagram of FIG. 2 is carried over. The clutches and couplings are correspondingly presented whereas the nodes of the planetary gear sets now appear as components of planetary gear sets such as sun gear members, ring gear members, planet gears and planet gear carrier members.

For example, the first planetary gear set 14 of transmission 210, includes a sun gear member 14A, a ring gear member 14C, and a planet gear carrier member 14B that rotatably supports a set of planet gears 14D (only one of which is shown). The sun gear member 14A is connected for common rotation with a first shaft or interconnecting member 36. The ring gear member 14C is connected for common rotation with a second shaft or interconnecting member 38. The planet gear carrier member 14B is connected for common rotation with a third shaft or interconnecting member 40. The planet gears 14D are each configured to intermesh with both of the sun gear member 14A and the ring gear member 14C.

The second planetary gear set 16 of transmission 210 includes the sun gear member 16A, a ring gear member 16C, and a planet gear carrier member 16B that rotatably supports a first set of planet gears 16D and a second set of planet gears 16E (only one of each set is shown). The sun gear member 16A is connected for common rotation with the input shaft or member 12. The ring gear member 16C is connected for common rotation with the second shaft or interconnecting member 38. The planet gear carrier member 16B is connected for common rotation with the third shaft or interconnecting member 40. The first set of planet gears 16D are each configured to intermesh with both of the ring gear member 16C and the second set of planet gears 16E. The second set of planet gears 16E are each configured to intermesh with both the first set of planet gears 16D and the sun gear member 16A.

The third planetary gear set 18 includes a sun gear member 18A, a ring gear member 18C, and a planet gear carrier member 18B that rotatably supports a set of planet gears 18D (only one of which is shown). The sun gear member 18A is connected for common rotation with the third shaft or interconnecting member 40. The ring gear member 18C is connected for common rotation with the output shaft or member 22. The planet gear carrier member 18B is connected for common rotation with a fourth shaft or interconnecting member 42. The planet gears 18D are each configured to intermesh with both of the sun gear member 18A and the ring gear member 18C.

The fourth planetary gear set 20 of transmission 210 includes a sun gear member 20A, a ring gear member 20C, and a planet gear carrier member 20B that rotatably supports a set of planet gears 20D (only one of which is shown). The sun gear member 20A is connected for common rotation with a fifth shaft or interconnecting member 44. The ring gear member 20C is connected for common rotation with the fourth shaft or interconnecting member 42. The planet gear carrier member 20B is connected for common rotation with the output shaft or member 22. The planet gears 20D are each configured to intermesh with both of the sun gear member 20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28, 30 and clutches 32, 34 allow for selective interconnection of the shafts or interconnecting members, members of the planetary gear sets and the housing. For example, a first brake 24 is selectively engageable to interconnect the first shaft or interconnecting member 36 with a stationary member or transmission housing 50. A second brake 26 is selectively engageable to interconnect the second shaft or interconnecting member 38 with the stationary member or transmission housing 50. A third brake 28 is selectively engageable to interconnect the third shaft or interconnecting member 40 with the stationary member or transmission housing 50. A fourth brake 30 is selectively engageable to interconnect the fourth shaft or interconnecting member 42 with the stationary member or transmission housing 50. A first clutch 32 is selectively engageable to interconnect the fourth shaft or interconnecting member 42 with the input shaft or member 12. The second clutch 34 is selectively engageable to interconnect the fifth shaft or interconnecting member 44 with the input shaft or member 12.

Referring now to FIGS. 3 and 7, the operation of the embodiment of the eight speed transmission 210 will be described. It will be appreciated that the transmission 210 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque transmitting mechanisms (i.e. first brake 24, second brake 26, third brake 28, fourth brake 30, first clutch 32, and second clutch 34), as will be explained below. FIG. 7 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24 and the fourth brake 30 are engaged or activated. The first brake 24 connects the first shaft or interconnecting member 36 with the stationary member or transmission housing 50 in order to prevent the first shaft or interconnecting member 36 and therefore the sun gear member 14A of the first planetary gear set 14 from rotating relative to the transmission housing 50. The fourth brake 30 connects the fourth shaft or interconnecting member 42 with the stationary member or transmission housing 50 in order to prevent the fourth shaft or interconnecting member 42 and therefore the planet gear carrier member 18B of the third planetary gear set 18 and the ring gear member 20C of the fourth planetary gear set 20 from rotating relative to the transmission housing 50. Likewise, the eight forward ratios are achieved through different combinations of clutch and brake engagement, as shown in FIG. 6.

Figure 4:
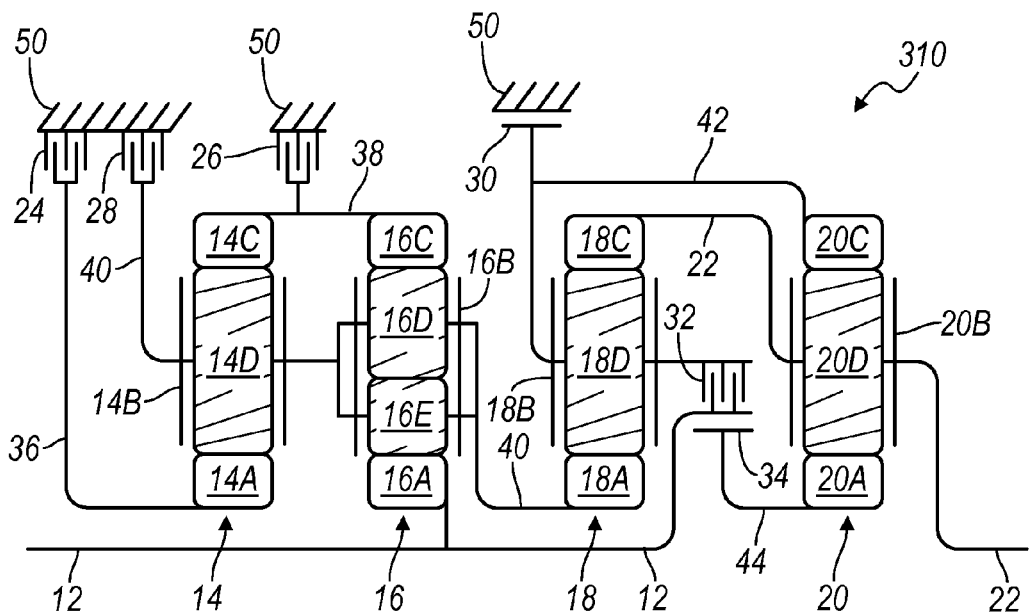
FIG. 4 is a diagrammatic view of an example of an eight speed transmission according to the present invention.
Figure 5:
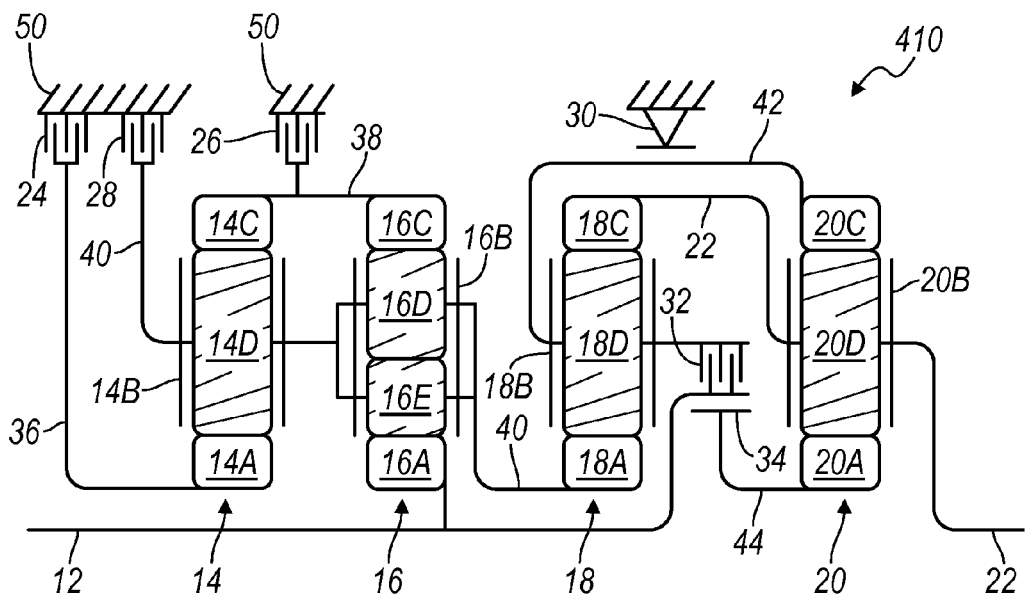
FIG. 5 is a diagrammatic view of an example of an eight speed transmission according to the present invention.
Figure 6:
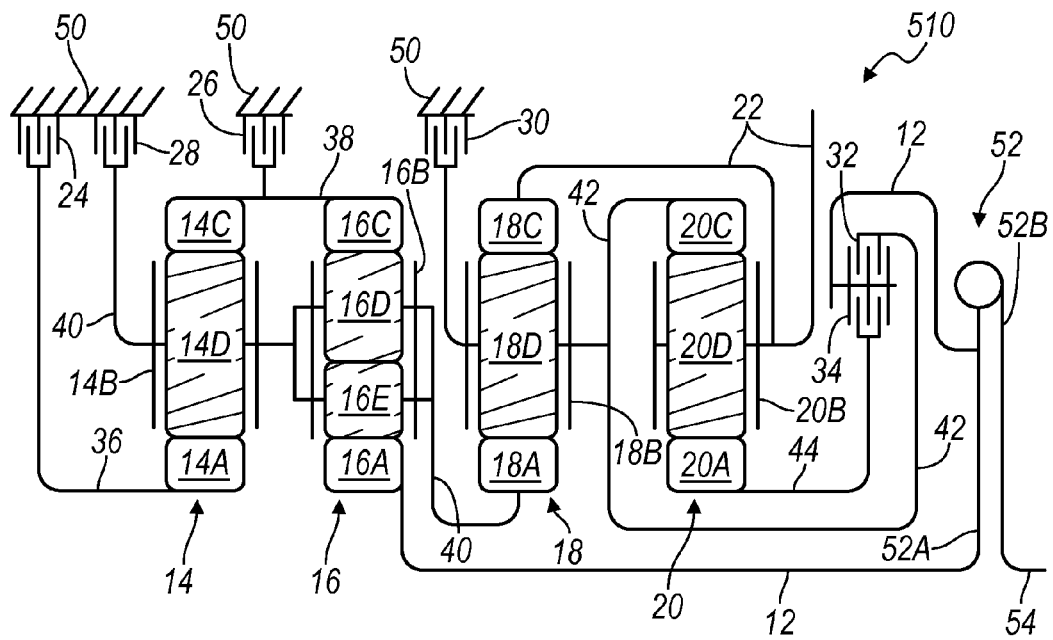
FIG. 6 is a diagrammatic view of an example of an eight speed transmission according to the present invention.

Referring now to FIGS. 4-6, several examples of the transmission of the present invention are illustrated. More specifically, transmissions 310, 410, 510, each include alternative torque transmitting mechanisms. For example, FIG. 4 illustrates transmission 210 including six torque transmitting mechanisms 24, 26, 28, 30, 32, 34. The first, second, third and fourth torque transmitting mechanisms are brakes 24, 26, 28, 30 and the fifth and sixth torque transmitting mechanisms are clutches 32, 34. Additionally, the first, second, third and fifth torque transmitting mechanisms 24, 26, 28, 32 are interleaved friction disc and piston torque transmitting mechanisms. The fourth and sixth torque transmitting mechanisms 30, 34 are dog-type torque transmitting mechanisms.

Referring now to FIG. 5, another example of the transmission of the present invention is illustrated. The transmission 410 includes six torque transmitting mechanisms 24, 26, 28, 30, 32, 34. The first, second, third and fourth torque transmitting mechanisms are brakes 24, 26, 28, 30 and the fifth and sixth torque transmitting mechanisms are clutches 32, 34. Additionally, the first, second, third and fifth torque transmitting mechanisms 24, 26, 28, 32 are interleaved friction disc and piston torque transmitting mechanisms. The fourth torque transmitting mechanism 30 is a selectable one-way clutch. The sixth torque transmitting mechanisms 34 is a dog-type torque transmitting mechanisms.

Referring now to FIGS. 6 and 7, another example of the transmission of the present invention is illustrated. Transmission 510 is shown connected to a flywheel or damper 52 instead of a torque converter. The transmission 510 includes friction launch clutches in place of one or more of the torque transmitting mechanisms. For example, transmission 510 includes an input shaft or member 12 that is drivingly connected to an output 52A of the flywheel or damper 52 to which an input 52B of the flywheel or damper 52 is drivingly connected to an engine output 54. The input shaft or member 12 is interconnected with the sun gear 16A of the second planetary gear set. The input shaft or member 12 is selectively connected to the sun gear 20A of the fourth planetary gear set 20 through the second clutch 34 and to the fourth interconnecting member 42 through the first clutch 32. The transmission 510 further includes four brakes 24, 26, 28, 30, however, the fourth brake 30 is replaced with a friction launch clutch 30. As noted in the truth table of FIG. 7, clutch 34 and friction launch clutch 30 are engaged in order to achieve the first gear ratio. Absent a torque converter, a launch feel is achieved by fully engaging the first brake 24 while tightly controlling the engagement of the friction launch clutch 30. Tightly controlling the engagement of the friction launch clutch 30 allows for some clutch slip to achieve the same feel of the gradual engagement of a torque converter.

The same method can be executed regarding launch in the reverse gear ratio. As show in the truth table of FIG. 7, the friction launch clutch 30 and brake 24 are engaged in order to achieve the reverse gear ratio. The reverse launch feel is achieved by fully engaging the first brake 24 while tightly controlling the engagement of the friction launch clutch 30. Again, tightly controlling the engagement of the friction launch clutch 30 allows for some clutch slip to achieve the same feel of the gradual engagement of a torque converter.

The transmission 510 may also substitute a friction launch clutch for the first brake 24 and the second clutch 34 while the brake 30 remains an interleaved multiple disk friction brake. As noted in the truth table of FIG. 7, friction launch clutch 34 and brake 30 are engaged in order to achieve the first gear ratio. Absent a torque converter, a launch feel is achieved by fully engaging the fourth brake 30 while tightly controlling the engagement of the friction launch clutch 34. Tightly controlling the engagement of the friction launch clutch 34 allows for some clutch slip to achieve the same feel of the gradual engagement of a torque converter.

The same method can be executed regarding launch in the reverse gear ratio. As show in the truth table of FIG. 7, the fourth brake 30 and the friction launch clutch 24 are engaged in order to achieve the reverse gear ratio. The reverse launch feel is achieved by fully engaging the fourth brake 30 while tightly controlling the engagement of the friction launch clutch 24. Again, tightly controlling the engagement of the friction launch clutch 24 allows for some clutch slip to achieve the same feel of the gradual engagement of a torque converter.

It will be appreciated that the foregoing explanation of operation and gear states of the eight speed transmissions 10, 110, 210, 310, 410, 510 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the second member of the first planetary gear set with the second member of the second planetary gear set;
   a second interconnecting member continuously interconnecting the third member of the first planetary gear set with the third member of the second planetary gear set and the first member of the third planetary gear set;
   a third interconnecting member continuously interconnecting the second member of the third planetary gear set with the third member of the fourth planetary gear set;
   a fourth interconnecting member continuously interconnecting the third member of the third planetary gear set with the second member of the fourth planetary gear set; and
   six torque transmitting mechanisms each selectively engageable to interconnect one of the first members, second members, and third members of the planetary gear sets with another one of the first members, second members, third members of the planetary gear sets, and a stationary member, and
   wherein the torque transmitting mechanisms are selectively engageable in combinations of at least two to establish at least eight forward speed ratios and at least one reverse speed ratio between the input member and the output member.

2. The transmission of claim 1 wherein a first of the six torque transmitting mechanisms is selectively engageable to interconnect the first member of the first planetary gear set with the stationary member.

3. The transmission of claim 2 wherein a second of the six torque transmitting mechanisms is selectively engageable to interconnect the third member of the first planetary gear set with the stationary member.

4. The transmission of claim 3 wherein a third of the six torque transmitting mechanisms is selectively engageable to interconnect the first member of the third planetary gear set with the stationary member.

5. The transmission of claim 4 wherein a fourth of the six torque transmitting mechanisms is selectively engageable to interconnect the second member of the third planetary gear set with the stationary member.

6. The transmission of claim 5 wherein a fifth of the six torque transmitting mechanisms is selectively engageable to interconnect the third member of the fourth planetary gear set with the first member of the second planetary gear set.

7. The transmission of claim 6 wherein a sixth of the six torque transmitting mechanisms is selectively engageable to interconnect the first member of the fourth planetary gear set with the first member of the second planetary gear set.

8. The transmission of claim 1 wherein the input member is continuously interconnected with the first member of the second planetary gear set and the output member is continuously interconnected with the third member of the third planetary gear set and the second member of the fourth planetary gear set.

9. The transmission of claim 1 wherein the first members of the planetary gear sets are sun gears, the second members of the planetary gear sets are carrier members and the third members of the planetary gear sets are ring gears.

10. The transmission of claim 1 wherein the stationary member is a transmission housing.

11. The transmission of claim 1 wherein the first, second, third and fourth of the six torque transmitting mechanisms are brakes and the fifth and sixth of the six torque transmitting mechanisms are clutches.

12. The transmission of claim 1 wherein the first, second, and third of the six torque transmitting mechanisms are brakes, the fourth and sixth of the six torque transmitting mechanisms are dog clutches, and the fifth of the six torque transmitting mechanisms is a clutch.

13. The transmission of claim 1 wherein the first, second, and third of the six torque transmitting mechanisms are brakes, the fourth of the six torque transmitting mechanisms is a selectable one-way clutch, the fifth of the six torque transmitting mechanisms is a clutch, and the sixth of the six torque transmitting mechanisms is a dog clutch.

14. A transmission comprising:
    an input member;
    an output member;
    first, second, third and fourth planetary gear sets each having first, second and third members, wherein the input member is continuously interconnected with the first member of the second planetary gear set and the output member is continuously interconnected with the third member of the third planetary gear set;
    a first interconnecting member continuously interconnecting the second member of the first planetary gear set with the second member of the second planetary gear set;
    a second interconnecting member continuously interconnecting the third member of the first planetary gear set with the third member of the second planetary gear set and the first member of the third planetary gear set;
    a third interconnecting member continuously interconnecting the second member of the third planetary gear set with the third member of the fourth planetary gear set;
    a fourth interconnecting member continuously interconnecting the third member of the third planetary gear set with the second member of the fourth planetary gear set; and
    six torque transmitting mechanisms each selectively engageable to interconnect one of the first members, second members, and third members of the planetary gear sets with another one of the first members, second members, third members of the planetary gear sets, and a stationary member, and wherein the torque transmitting mechanisms are selectively engageable in combinations of at least two to establish at least eight forward speed ratios and at least one reverse speed ratio between the input member and the output member.

15. The transmission of claim 14 wherein a first of the six torque transmitting mechanisms is selectively engageable to interconnect the first member of the first planetary gear set with the stationary member.

16. The transmission of claim 15 wherein a second of the six torque transmitting mechanisms is selectively engageable to interconnect the third member of the first planetary gear set with the stationary member.

17. The transmission of claim 16 wherein a third of the six torque transmitting mechanisms is selectively engageable to interconnect the first member of the third planetary gear set with the stationary member.

18. The transmission of claim 17 wherein a fourth of the six torque transmitting mechanisms is selectively engageable to interconnect the second member of the third planetary gear set with the stationary member.

19. The transmission of claim 18 wherein a fifth of the six torque transmitting mechanisms is selectively engageable to interconnect the third member of the fourth planetary gear set with the first member of the second planetary gear set.

20. The transmission of claim 19 wherein a sixth of the six torque transmitting mechanisms is selectively engageable to interconnect the first member of the fourth planetary gear set with the first member of the second planetary gear set.

21. The transmission of claim 14 wherein the first members of the planetary gear sets are sun gears, the second members of the planetary gear sets are carrier members and the third members of the planetary gear sets are ring gears.

22. The transmission of claim 14 wherein the stationary member is a transmission housing.

23. The transmission of claim 14 wherein the first, second, third and fourth of the six torque transmitting mechanisms are brakes and the fifth and sixth of the six torque transmitting mechanisms are clutches.

24. The transmission of claim 14 wherein the first, second, and third of the six torque transmitting mechanisms are brakes, the fourth and sixth of the six torque transmitting mechanisms are dog clutches, and the fifth of the six torque transmitting mechanisms is a clutch.

25. The transmission of claim 14 wherein the first, second, and third of the six torque transmitting mechanisms are brakes, the fourth of the six torque transmitting mechanisms is a selectable one-way clutch, the fifth of the six torque transmitting mechanisms is a clutch, and the sixth of the six torque transmitting mechanisms is a dog clutch.

26. A transmission comprising:
an input member;
an output member;
a transmission housing;
first, second, third and fourth planetary gear sets each having sun gear, a carrier member and a ring gear, wherein the input member is continuously interconnected with the sun gear of the second planetary gear set and the output member is continuously interconnected with the ring gear of the third planetary gear set;
a plurality of interconnecting members each drivingly connecting one of the first, second, and third members of the planetary gear sets with another one of the first, second, and third members of the planetary gears sets;
a first torque transmitting mechanism selectively engageable to interconnect the sun gear of the first planetary gear set with the transmission housing;
a second torque transmitting mechanism selectively engageable to interconnect the ring gear of the first planetary gear set with the transmission housing;
a third torque transmitting mechanism selectively engageable to interconnect the sun gear of the third planetary gear set with the transmission housing;
a fourth torque transmitting mechanism selectively engageable to interconnect the carrier member of the third planetary gear set with the transmission housing;
a fifth torque transmitting mechanism selectively engageable to interconnect the ring gear of the fourth planetary gear set with the sun gear of the second planetary gear set; and
a sixth torque transmitting mechanism selectively engageable to interconnect the sun gear of the fourth planetary gear set with the sun gear of the second planetary gear set, and
wherein the torque transmitting mechanisms are selectively engageable in combinations of at least two to establish at least eight forward speed ratios and at least one reverse speed ratio between the input member and the output member.

27. The transmission of claim 26 wherein the fourth and sixth of the six torque transmitting mechanisms are dog clutches.

28. The transmission of claim 26 wherein the fourth of the six torque transmitting mechanisms is a selectable one-way clutch and the sixth of the six torque transmitting mechanisms is a dog clutch.

29. The transmission of claim 26 wherein a first of the plurality of interconnecting members continuously interconnects the carrier member of the first planetary gear set with the carrier member of the second planetary gear set.

30. The transmission of claim 29 wherein a second of the plurality of interconnecting members continuously interconnects the ring gear of the first planetary gear set with the ring gear of the second planetary gear set and the sun gear of the third planetary gear set.

31. The transmission of claim 30 wherein a third of the plurality of interconnecting members continuously interconnects the carrier member of the third planetary gear set with the ring gear of the fourth planetary gear set.

32. The transmission of claim 31 wherein a fourth of the plurality of interconnecting members continuously interconnects the ring gear of the third planetary gear set with the carrier member of the fourth planetary gear set.

* * * * *